Patented Sept. 10, 1929.

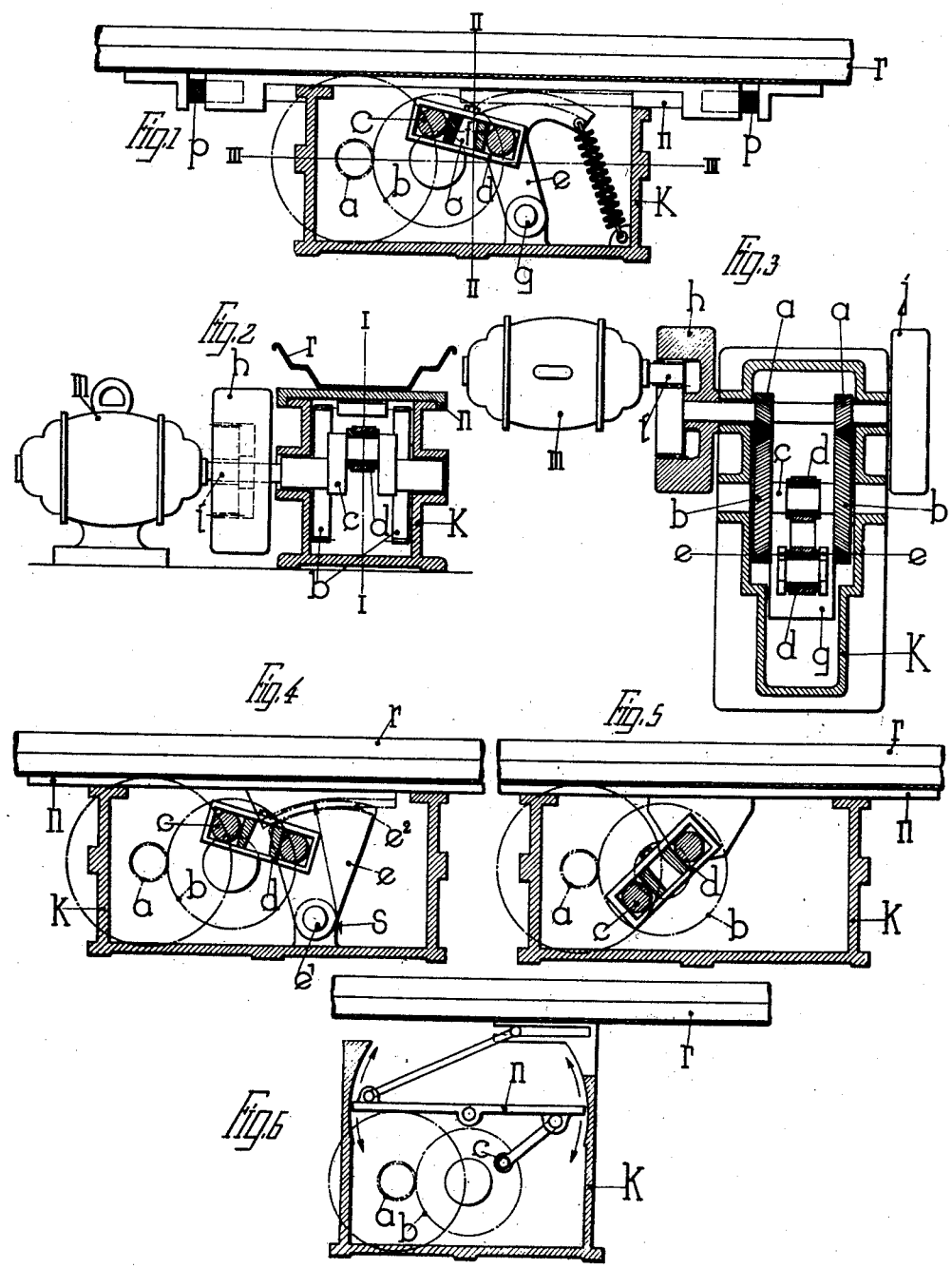

1,727,451

UNITED STATES PATENT OFFICE.

KARL STRÖDTER, OF BOCHUM, GERMANY.

RECIPROCATORY MECHANISM.

Application filed July 31, 1926, Serial No. 126,301, and in Germany March 9, 1926.

This invention relates to improvements in devices such as jigger devices and particularly to conveyers of this type.

In shaker conveyers driven from a rotary member such as for example the shaft of an electric motor, the comparatively complicated transmission gear between the driving member and the conveyer was, hitherto, more or less unprotected, and was in consequence, especially when used in mines, exposed to the very detrimental effects of dirt and moisture and also to the danger of being damaged.

In contradistinction thereto, according to the present invention, the entire driving gear or its more important or sensitive components is or are enclosed completely by being disposed in a casing with a movable wall, the motion of the motor being transmitted to this movable wall which in turn transmits to the conveyer the movement imparted to it and which is connected to the rest of the casing in such a manner that even when executing its operative movements, the casing remains closed.

Complete enclosure of the driving elements also allows of the employment of sensitive, precisely cut gear wheels, such as for example wheels with helical teeth which result in smooth and uniform operation and more favourable meshing conditions than is the case with pinions with straight teeth and which also enable larger gear ratios to be employed than the latter. Moreover, the enclosure of the driving gear provides sufficient protection against dirt and rust and allows the gear to be efficiently lubricated which may be readily effected by running the gear wheels in an oil bath in the casing.

Four modifications of the invention are illustrated by way of example in the accompanying drawings, in which:

Fig. 1 is a longitudinal section (on I—I of Fig. 2) of one modification,

Fig. 2 is a cross section thereof (on II—II Fig. 1),

Fig. 3 is a horizontal section of the same (on III—III Fig. 1),

Fig. 4 illustrates a second modification,

Fig. 5 a third modification, and

Fig. 6 a fourth modification, the three last figures being longitudinal sections.

The casing $k$ containing the driving gear for the conveyer has a wall which moves thereon in a dust-tight manner, sliding for example in a groove-guide or rolling on rolling members. In the constructions illustrated in the accompanying drawings this wall is a cover $n$ which is movable in the manner stated and which in the example illustrated in Figs. 1–3 receives a reciprocatory movement from the toothed rocker $e$. The cover transmits its movement to the conveyer $r$ which may be secured thereto, as conditions demand, either directly or through the intermediary of buffer members $p$. The movement of the wall or cover $n$ may, however, be transmitted to the conveyer indirectly through any desired intermediate members such as rods, levers, ropes, chains or the like or the cover may be adapted to form a part of the conveyer itself. The length of the wall or cover $n$ is made so great that in both its end positions it covers the casing $k$.

The transmission gear between the motor $m$ and the conveyer $r$ consists of a pair of gear wheels $h\,i$ with straight teeth, two gear wheels $a\,b$ with helical teeth, a crank-shaft $c$, a connecting rod $d$ and a rocker member $e$. The gear $a\,b$ consists of two pairs of gear wheels which are arranged on either side of the crank $c$, the teeth of corresponding wheels of each pair having oppositely directed helices so that no axial thrust is exerted on the shaft.

The gear wheels $b$ are mounted directly on squared portions on the crank shaft $c$ as this arrangement ensures a safer power transmission than keys or the like. The connecting rod $d$ consists of a frame in which two bearings $f$ are mounted in such a manner that the said bearings may be adjusted by means of a wedge or the like. The gear $h\,i$ consists of an internally toothed flywheel and a pinion, this arrangement having the advantage of occupying little space and providing not only protection for the pinion, but also more favorable meshing conditions than would be the case if the pinion were arranged on the outside. Further, the internal arrangement of the pinion offers the possibility of employing the fly-wheel as a pulley for a belt drive. If necessary a second fly-wheel $j$ may also be provided.

A particularly suitable conveyer movement may be obtained with this construction of gear by making the rocker $e$ (Fig. 4) as a toothed segment of which the axis $e'$ of rotation is arranged eccentrically relatively to its centre point $s$. This allows a near approach to the ideal form of conveyer movement.

The connecting rod $d$ may, however, also be connected directly with the wall $n$, as illustrated in Fig. 5, instead of being connected therewith through a rocker or the like.

Instead of being made reciprocatory the wall ar cover $n$ may also be adapted to be oscillatory as is illustrated in Fig. 6. In this case the part $n$ is so disposed in the casing $k$, or the casing is so shaped, that the part $n$ remains, in its oscillatory operative movement, between the lateral walls of the casing. The oscillatory movement presents the advantage of obviating sliding or rolling friction.

I claim:—

1. In a drive for reciprocatory mechanism such as a jigger conveyer, in combination, a reciprocable element, driving gearing therefor, a casing enclosing the essential parts of the driving gearing, said casing having an open face, a movable casing wall adapted to close entirely the open face of the casing, the driving gearing being operatively connected to the reciprocable element through the intermediary of the movable casing wall.

2. In a device for reciprocatory mechanism such as a jigger conveyer, in combination, a reciprocable element, a driving gear casing having one face open, a movable casing wall operatively connected to the reciprocable element, gearing in the casing including a crank shaft, a prime mover operatively connected to the gearing, and means for operatively connecting the crank shaft to the reciprocable element through the intermediary of the movable casing wall, said movable casing wall covering entirely the open face of the casing while in motion as well as while stationary.

3. In a device for reciprocatory mechanism such as a jigger conveyer, in combination, a reciprocable element, a drive gear casing having one face open, a movable casing wall operatively connected to the reciprocable element, a shaft journalled in the casing, a prime mover operatively connected to the shaft, a pinion on the shaft, a crank shaft, a gear on the crank shaft meshing with the pinion and means for operatively connecting the crank shaft to the reciprocable element through the intermediary of the movable casing wall, said movable casing wall covering entirely the open face of the casing while in motion as well as while stationary.

In testimony whereof I have signed my name.

Dr. Ing. KARL STRÖDTER.